(12) United States Patent
Becker

(10) Patent No.: US 8,911,619 B2
(45) Date of Patent: Dec. 16, 2014

(54) METHOD AND APPARATUS FOR REMOVING OIL FROM A BODY OF WATER

(71) Applicant: William R. Becker, Seattle, WA (US)

(72) Inventor: William R. Becker, Seattle, WA (US)

( * ) Notice: Subject to any disclaimer, the term of this patent is extended or adjusted under 35 U.S.C. 154(b) by 0 days.

(21) Appl. No.: 14/157,374

(22) Filed: Jan. 16, 2014

(65) Prior Publication Data

US 2014/0231362 A1    Aug. 21, 2014

Related U.S. Application Data

(62) Division of application No. 13/773,267, filed on Feb. 21, 2013, now Pat. No. 8,663,467.

(51) Int. Cl.
*E02B 15/04* (2006.01)
*E02B 15/10* (2006.01)
*E21B 43/01* (2006.01)
*E02B 15/08* (2006.01)
*E02B 15/00* (2006.01)

(52) U.S. Cl.
CPC .............. *E02B 15/047* (2013.01); *E02B 15/10* (2013.01); *E21B 43/0122* (2013.01); *E02B 2015/005* (2013.01); *E02B 15/046* (2013.01); *E02B 15/0814* (2013.01); *Y10S 210/923* (2013.01)
USPC .............. 210/170.05; 210/170.11; 210/242.3; 210/540; 210/923; 405/60

(58) Field of Classification Search
CPC ... E21B 43/0122; E02B 15/046; E02B 15/08; E02B 15/0814; E02B 15/10; E02B 2015/005; Y10S 210/923

USPC ......... 210/747.5, 747.6, 776, 170.05, 170.09, 210/170.11, 242.3, 540, 923; 405/60

See application file for complete search history.

(56) References Cited

U.S. PATENT DOCUMENTS

| 2,580,465 | A | 1/1952 | Ronne |
| 2,994,891 | A | 8/1961 | Przybylski |
| 3,508,652 | A | 4/1970 | Woolley |

(Continued)

FOREIGN PATENT DOCUMENTS

| EP | 0678477 A1 | 10/1995 |
| GB | 2239819 A1 | 7/1991 |
| WO | 98/39520 A1 | 9/1998 |
| WO | 2009/122117 A1 | 10/2009 |

OTHER PUBLICATIONS

Gulf Oil Spill Solution, "How to Fix the Gulf Oil Spill?", 2010, retrieved from URL: http://www.gulfoilspillsolution.org/, 2 pages.

(Continued)

*Primary Examiner* — Christopher Upton
(74) *Attorney, Agent, or Firm* — Seed IP Law Group PLLC

(57) ABSTRACT

Methods and apparatus are disclosed for capturing and removing oil from a body of water with equipment using rod and film technology, which includes a streamlined oil tank that moves in the water and collects surface oil from an attached skimmer, arrays of inverted funnels lowered into the water to concentrate oil for removal, and containment tents to capture leaking fuel or cargo oil from a sunken ship or any underwater oil leak and channel it into a partially submerged rod and film storage tank at the surface.

14 Claims, 13 Drawing Sheets

(56) References Cited

U.S. PATENT DOCUMENTS

| | | | |
|---|---|---|---|
| 3,685,653 A | | 8/1972 | Van Stavern et al. |
| 3,698,339 A | | 10/1972 | Golay et al. |
| 3,700,107 A | | 10/1972 | Flaviani |
| 3,745,773 A | * | 7/1973 | Cunningham ............... 405/60 |
| 3,784,013 A | * | 1/1974 | Daniel ..................... 210/242.3 |
| 3,959,136 A | | 5/1976 | Ayers et al. |
| 4,178,247 A | | 12/1979 | Janson |
| 4,360,429 A | | 11/1982 | Morris |
| 4,368,122 A | | 1/1983 | Ravagnan |
| 4,395,157 A | * | 7/1983 | Cunningham ............... 405/60 |
| 4,399,040 A | | 8/1983 | Ayers et al. |
| 4,449,850 A | | 5/1984 | Cessou et al. |
| 4,514,299 A | | 4/1985 | Ayroldi |
| 4,531,860 A | * | 7/1985 | Barnett ..................... 405/60 |
| 4,669,972 A | | 6/1987 | Koblanski |
| 4,681,057 A | | 7/1987 | Girag |
| 5,073,261 A | | 12/1991 | Conradi et al. |
| 5,316,672 A | | 5/1994 | Wilson et al. |
| 5,470,467 A | | 11/1995 | Soule |
| 5,792,350 A | | 8/1998 | Sorley et al. |
| 5,824,231 A | | 10/1998 | Blomberg |
| 6,500,337 B1 | | 12/2002 | Ehrnsperger et al. |
| 6,609,853 B1 | * | 8/2003 | Guilmette ..................... 405/60 |
| 7,182,860 B2 | * | 2/2007 | Lundin ..................... 210/242.3 |
| 7,384,548 B2 | | 6/2008 | Terrien et al. |
| 7,410,577 B2 | | 8/2008 | Broje |
| 8,173,012 B1 | * | 5/2012 | Che ..................... 210/170.05 |
| 8,404,122 B1 | * | 3/2013 | Quaglino, Jr. ............. 210/747.5 |
| 2009/0314725 A1 | * | 12/2009 | Parro ..................... 210/242.1 |

OTHER PUBLICATIONS

InnoCentive, Inc., "Oil Spill Challenge 'Solution Revealed' #1: 'Hypalon' Containment", 2012, retrieved from URL: http://www.innocentive.com/blog/2010/06/22/solution-revealed-oil-spill-challenge-hypalon-containment/, 8 pages.

* cited by examiner

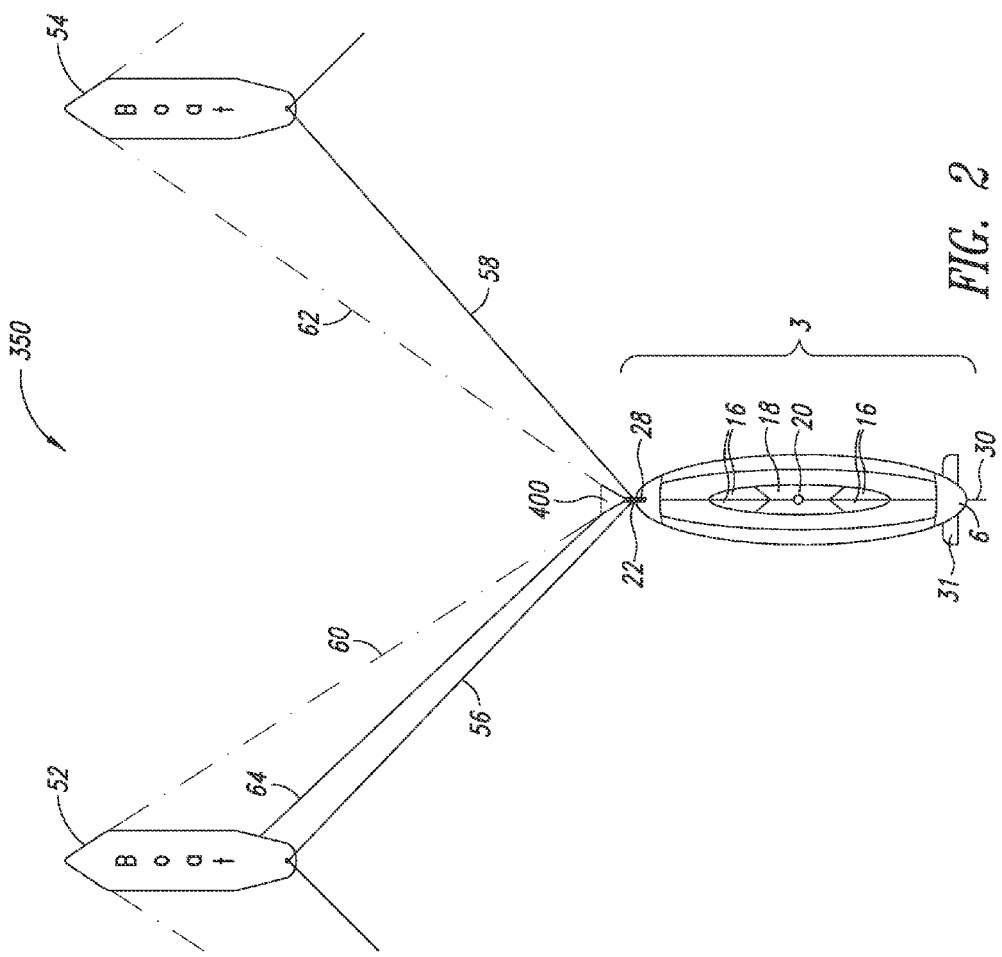

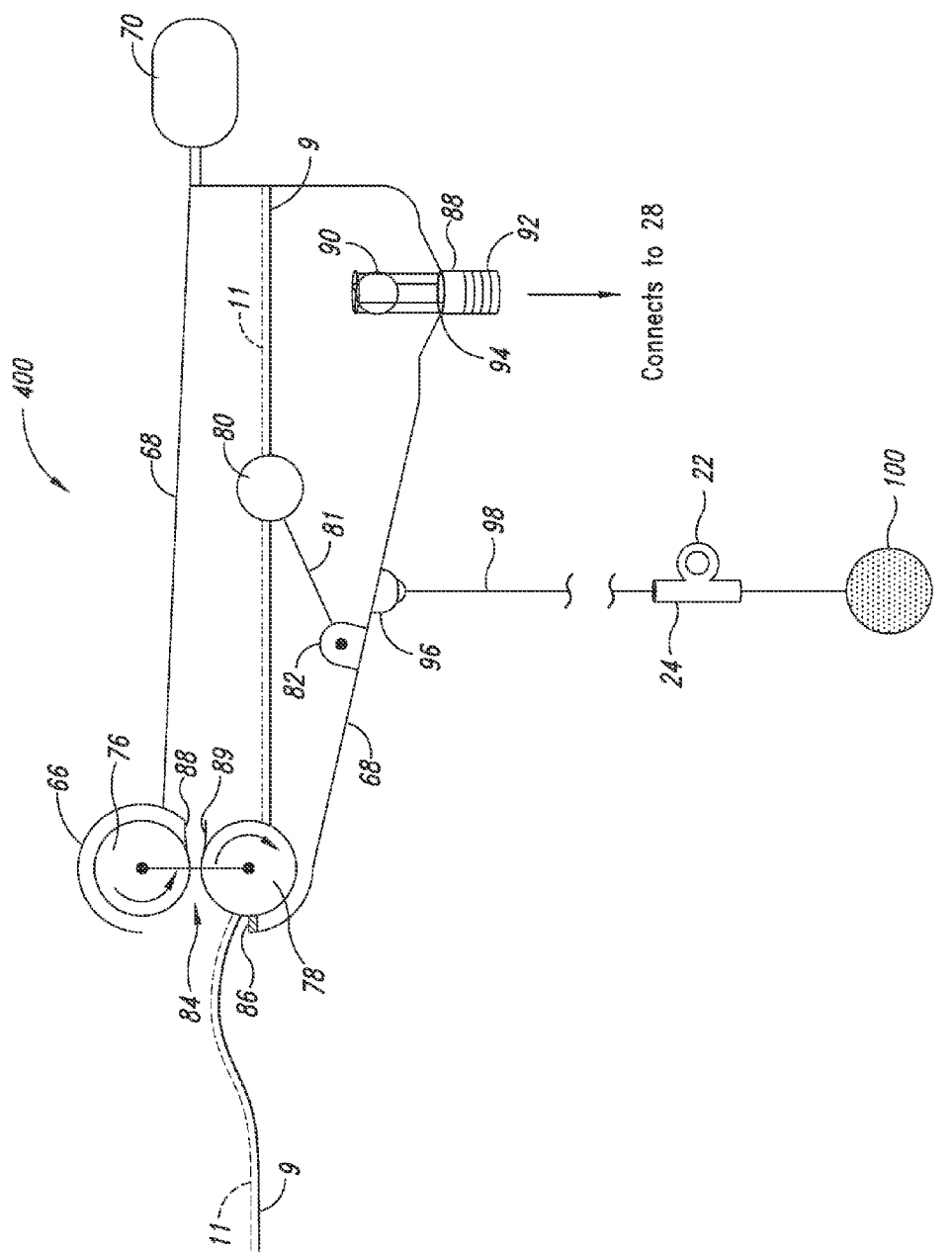

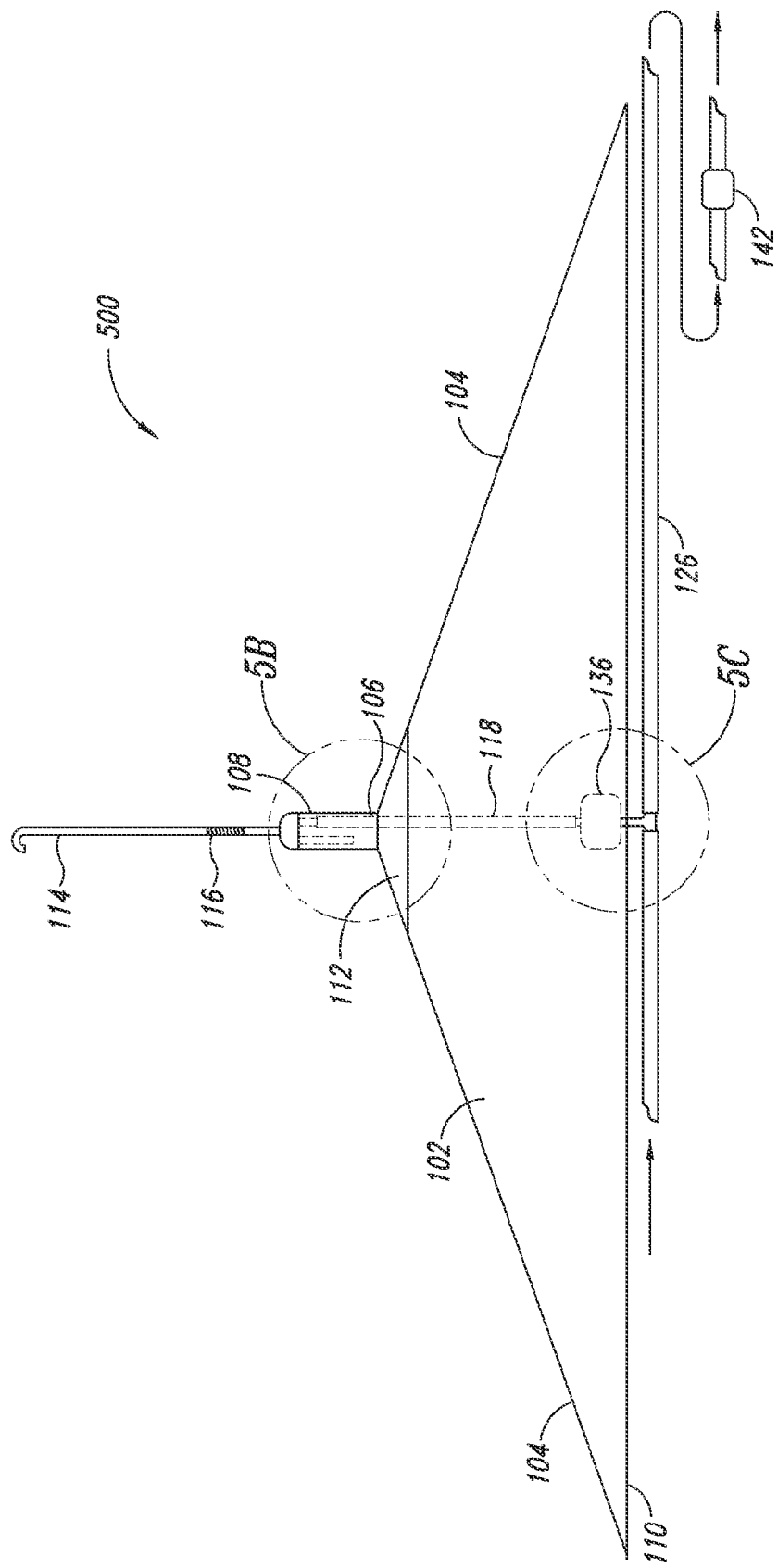

METHOD AND APPARATUS FOR REMOVING OIL FROM A BODY OF WATER

BACKGROUND

1. Technical Field

The present invention relates to systems, apparatus, and methods to contain and remove oil from a body of water. It can also apply to any immiscible liquids in which the lighter liquid is extracted from the heavier.

2. Description of Related Art

U.S. Pat. No. 3,959,136 to Ayers et al. discloses a method and apparatus for removing small volumes of oil from the surface of a body of water. The device in Ayers skims the surface as it is moved through the water by boat.

U.S. Pat. No. 4,449,850 to Cessou et al. discloses an inverted conical funnel for trapping oil as it comes out of a broken well. The device in Cessou is designed to cap the well and remove the oil at the source of the spill.

U.S. Pat. No. 7,410,577 to Broje et al. discloses an apparatus for recovering surface oil from a spill by using a skimmer with a grooved spinning drum. The grooves improve the adherence of oil to the drum while spinning off the water.

3. Causes of Failure

Rapid response to properly clean up an oil spill is critical. The fast spread of oil on water makes containing it harder by the minute. The oil's increased surface area also speeds its evaporation, leaving the remaining oil more viscous, sticky, heavy and difficult to clean up. If not removed before reaching a "tar ball" stage, large scale cleanup becomes nearly impossible. As tar balls sink almost below the surface, evaporation no longer occurs on the surface of the ball, and they remain suspended in the water column until they wash ashore.

One cause of delay is the lack of local cleanup equipment. Current equipment is expensive, bulky, and too infrequently used for most outfitters and boat owners to invest in it. Strong ultra-light materials now allow the manufacture of portable and relatively inexpensive equipment in kit form. Other causes of delay are how to recruit enough local volunteer boats to effect the cleanup, who will pay them, and how would they get the necessary booms to contain the spill.

While corralling an oil slick, it can become so thick that oil escapes under the boom. Therefore if the speed of harvesting does not match or exceed the speed of concentration of the oil, the ability to recover the oil is lost and it pollutes the water and shore. There is need for equipment and techniques that permit recovery of oil from water at a sufficiently high rate.

BRIEF SUMMARY

The present disclosure proposes tools and procedures for boats, both large and small, to adequately contain and harvest an oil slick, even as large as that caused by the Deepwater Horizon failure of 2010. However, a successful clean-up of that magnitude would likely require the cooperation of the government and of the oil industry. In one preferred scenario the oil industry's responsibilities would include the delivery of enough oil booms for local volunteer boats to corral the spill without delay, the pumping of each boat's harvested oil into the industry's tankers or barges, and above all paying each boat market prices per barrel for its harvested oil. This would provide incentive for the immediate recruitment of the thousands of boats needed to do the job. The responsibilities of the Coast Guard and/or other government agencies would be to inspect and coordinate the volunteer boats, to inspect and coordinate the oil industry's jobs, and to try to collect re-imbursement from the spiller.

Note that the application of dispersants that sink the oil or disperse it into particles suspended in the water column is not compatible with the mass harvesting methods described herein.

The systems, methods, and apparatus disclosed herein are directed to oil recapturing equipment based on tent technology, which includes strong, ultra-light films, such as Mylar, Cuben Fiber or Silnylon, stretched over tent rods. These films must be oil resistant and should preferably have a surface or a coating that tends to shed oil. For stability, the rods are joined by various types of connectors, and are often under stress. The equipment can be packaged in kits and some may be assembled at sea.

One embodiment of such equipment is an ultra-light, streamlined, semi-submerged and partially self propelled oil tank that sucks up surface oil while moving through a spill. To corral an oil spill, many side-by-side towing boats, some perhaps 100 feet apart, push a conjoined oil boom that forms trailing V-shapes between the boats. The tank, pulled by its two towing boats, intersects the boom at the vertex of each V. When towed empty to the site of an oil slick the tank offers very little drag. Upon arrival it is allowed to fill with water and partially submerge. Using power generated by the towing boats, oil and water is drawn into the tank through an attached skimmer. The oil rises within the tank while the excess water sinks and is ejected by a propeller that also propels the tank and provides suction for the skimmer. The tank can hold thousands of barrels of oil but is limited by what its towing boats can power and tow.

In another embodiment, an ultra-light array of pyramid-shaped inverted tent funnels is held within a horizontal frame that may be considered a "dipping trap." It may be used once an oil spill has been contained within oil booms. The dipping trap, which in one embodiment can be suspended between two boats, can cover thousands of square feet and remove the surface oil within that area. The dipping trap may be assembled at sea or on shore and towed to the oil spill on pontoons. Strength and weight are critical; a trap's size is limited by its structural rigidity and by what boats can lift. A boat on either end of the trap lowers it into the water. As the funnels sink any oil under the inverted funnels concentrates in the funnel peaks and necks, from where the oil can be pumped into a storage tank. The trap is then raised to allow more oil to pass under it, and then lowered to capture more oil.

In another embodiment, a "self-dipping trap" may be used. An unmanned catamaran provides a support system that suspends a dipping trap between its hulls. The dipping trap is lowered and raised, and the captured oil pumped into a storage tank. Traps can be loosely connected to form a "trap-line".

In another embodiment, an ultra-light containment tent, a form of inverted funnel, is used to recover oil leaking below the surface of a body of water, such as a sunken vessel leaking fuel or cargo oil, or a slowly leaking wellhead site. A tent is lowered over the oil source. Attached to the bottom of the tent is a weighted framework that encompasses the oil source and keeps the tent's base open to the water. If convenient, the tent may be attached to the sunken ship itself. A flotation ring holds the tent's peak up into an inverted funnel shape which channels the oil to an oil containment bag at the surface.

Strong, ultra-light materials now exist that allow the manufacture of strong and reliable, yet portable and relatively inexpensive components to support the corralling and recapture of oil in high volumes. Examples of these materials include but are not limited to ultra-light support structures such as carbon fiber and aluminum, and films such as Mylar, Cuben fiber, or Silnylon that are assembled in a tent-like fashion. Examples of these components include but are not limited to inverted funnels, tanks, and pontoons.

BRIEF DESCRIPTION OF THE SEVERAL VIEWS OF THE DRAWINGS

FIG. 2 is a top view of two boats pushing booms and towing the tank of FIG. 1A.

FIG. 4 is a cutaway side view of the skimmer of FIG. 3.

FIG. 5A is a side view of an inverted pyramid funnel.

DETAILED DESCRIPTION

Figure 1A:
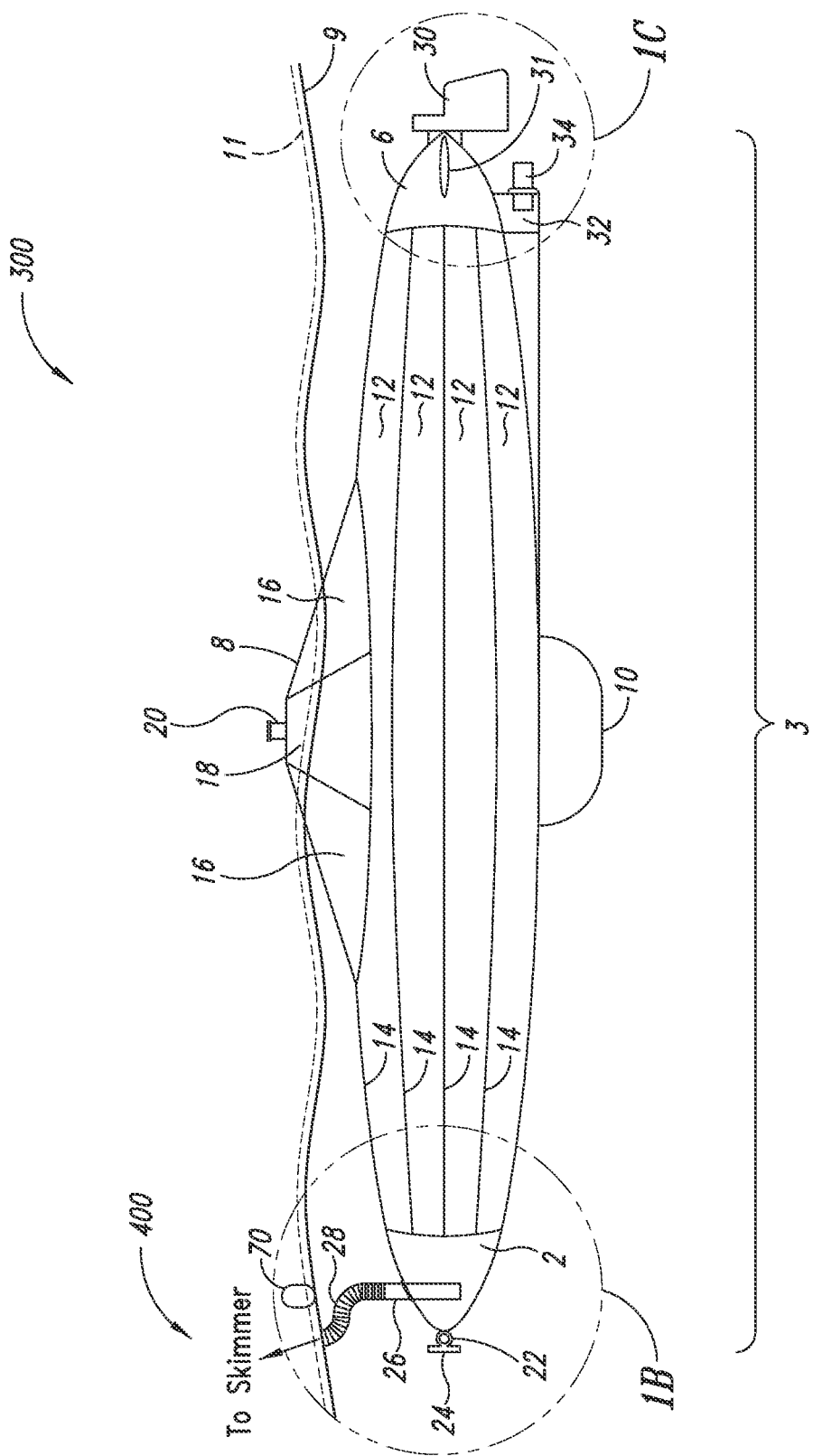
FIG. 1A is a cutaway side view of a partially submerged motorized tank for collecting oil.

FIG. 1A is a side view of a partially submerged, streamlined tank 300 that is both towed and self-propelled, receiving its power from its towing boat(s). The propeller also provides suction to draw in water and oil (but not air) through the attached skimmer 400. In one embodiment, tank 300 is an ultra-light tank made from rod and film technology. In another embodiment it is a light tank made of a rigid material such as carbon fiber or aluminum. The streamlined tank 3 may be towed empty across the surface of the water to the oil spill site with very little drag.

In one or more embodiments, a tank 300 is made up of one or more components including a nose cup 2, a body 3, a tail cup 6, a fin 8, and a keel 10.

In one or more embodiments the body 3 is a film body 12 with longitudinal internal sleeves containing tent rods 14. The ends of the tent rods are inserted in the sleeves and held under tension by being affixed into fittings in the nose cup 2 and tail cup 6. Fin 8 initially acts as an upper stabilizer, and contains flotation compartments 16 to keep the tank from sinking beyond fin 8 and to help keep it upright. In some embodiments, the uppermost pipe 20 opens into inverted funnel 18 to remove oil and to act as a vent when the tank is being filled with water prior to operation. In one or more embodiments a weighted keel 10 is attached to assist in controlling the center of buoyancy and keeping the tank upright and stable. In some embodiments horizontal stabilizer 31 is used to help keep the proper attitude of the tank in the water.

Figure 1C:
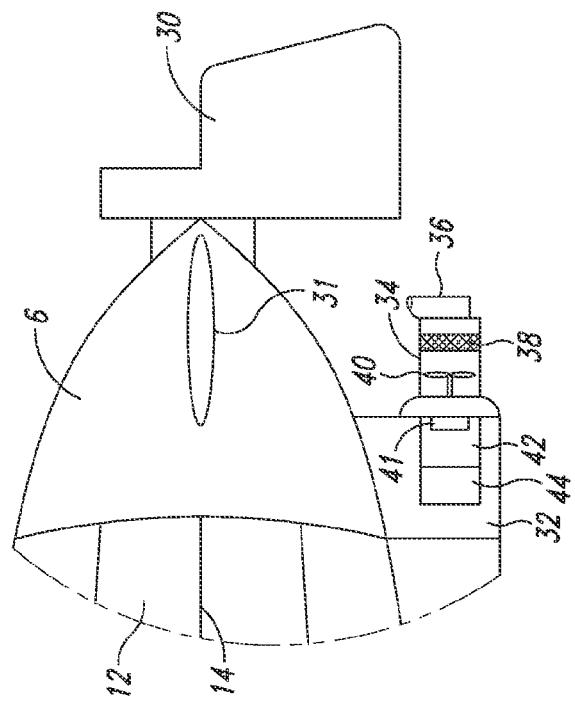
FIGS. 1B and 1C are side views of the details of a nose cap and tail cap.
Figure 1B:
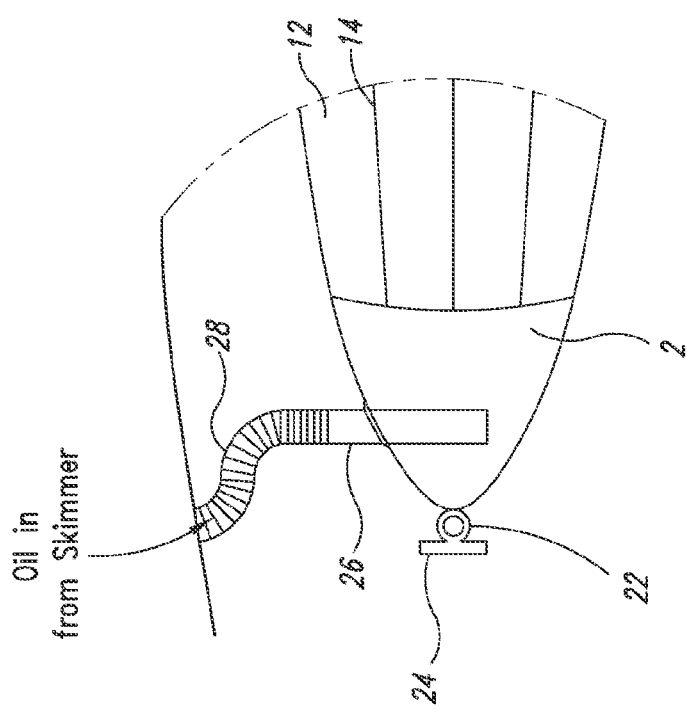

In one or more embodiments, the nose cup 2, described more in FIG. 1B, is made of corrosion-resistant material and contains a separate ring that fits inside the nose cup rim and attaches to it with screws (not shown). In one embodiment, the ring and the cup tightly sandwich the film 12 and hold it in place. The ring also retains the ends of the flexible tent rods 14 that give the tank body 3 its shape. Some embodiments include a towing ring 22, and a vertical tube 24 that acts as a bushing that allows rod 98 to keep the skimmer 400 at the right depth as it moves up and down with the waves. In some embodiments an intake pipe 26 is part of the nose cup assembly that draws in surface liquid from a skimmer 400 at the surface via a flexible tube 28.

The material 12 that is used to provide the body for the tank can be strong, ultra-light, waterproof, oil resistant, and preferably oil repellent. This might be considered similar to tent material of a self-supporting dome tent and the rods 14 would be the type of rods used for such a tent, for example, aluminum. Since the tank has liquid both inside and out, forces on it are reasonably balanced.

The tail cup 6, described in more detail in FIG. 1C, is made of corrosion-resistant material and contains a separate ring that fits inside the tail cup rim and attaches to it with screws (not shown). In one embodiment, the ring and the cup tightly sandwich the film 12 and hold it in place. The ring also retains the ends of the flexible tent rods 14 that give the tank body 3 its shape. In one or more embodiments the tail cup 6 contains a remotely controlled motor (not shown) to move the rudder 30 to keep the tank from drifting. One or more embodiments of the tail cup 6 includes lower tail cup section 32 that is open to the main body 3. It houses a propeller 40 attached to a motor 41, an oil level sensor (not shown) including an on/off switch for the motor, a watertight hatch 36 that can be opened and closed to let water in or out of the tank body 3, a debris screen 38, a lower rear tube 34, and a control box (not shown) that controls the operation of the components. In some embodiments, lower rear tube 34 will contain the propeller. One embodiment an oil level sensor (not shown) includes a bob that floats on water but sinks in oil, and which is attached to a hydraulic damper and an off switch for the motor so that any oil sensed in this section will shut off motor 41 and signal that the tank needs to be emptied. In some embodiments, the hatch 36 may be manually opened and closed from the surface by a bicycle brake cable.

In one embodiment, an empty tank is transported to the location of an oil spill, whereupon the tank body 3 is allowed to fill with water by uncapping pipe 20 to allow air to vent out and by opening hatch 36 allowing water to enter lower rear tube 34. Pipe 20 is closed when the tank is filled to the brim, and only reopened to pump out the oil. A screen 38 in the tube 34 keeps debris from being sucked into the tank while it is filling. Any debris on the screen is flushed off later by the force of the ejected water.

In one embodiment, during operation, oil 11 and water 9 enter the tank through skimmer 400 and into tank body 3. Within the body 3, the oil floats to the top, and the water sinks to the bottom and is ejected through lower rear tube 34. An oil sensor (not shown) in lower tail cup section 32 shuts off motor 41 and alerts the towing boat that the tank is full. In one embodiment, during operation the lower rear tube 34 houses a propeller 40 that ejects excess water from the tank body 3, which creates suction that helps draw water and oil into the skimmer 400. The operation of propeller 40 is also intended to reduce the drag on the boats towing the tank, but not so much that the tank's speed is faster than that of the towing boats. When the tank is ready to be emptied, oil is pumped out through pipe 20.

FIG. 1B shows an enlarged view of the nose cup 2 at the location taken from FIG. 1A. As can be seen, the nose cup 2 is a solid piece made of an acceptable material such as strong lightweight aluminum, which can hold a rigid shape. The purpose of the nose cup 2 is to provide a solid fitting and receptacle for the intake pipe 26 which couples to the skimmer 400, a rigid coupling for the support 22 which acts as a tow ring for the boat pulling it and also to support the skimmer 400, and as a retaining member for the individual rods 14. The ends of the film 12 are rigidly coupled to the nose cup 2 by any acceptable technique. When the tent rods 14 are placed into the sleeves of the material 12 and placed into the retaining members of the nose cup 2 and the tail cup 6, they will flex outward with rigid tension and give shape to the tank body 3, just as tent rods do when a tent is pitched in a dome tent.

The tail cup 6 is also made of a rigid material, such as aluminum, which can hold a rigid shape, in a curved dome as shown in FIG. 1C. The tail cup 6 supports a lower tail section 32 which contains a control box (not shown), an oil level sensor (not shown), and a motor 41 with a propeller 40. A horizontal stabilizer 31 may be coupled to the tail cup 6, as well as a rudder 30 in some embodiments.

FIG. 2 is a diagram of an embodiment of a tank being towed by two boats. Tow line 56 from the first boat 52 and tow line 58 from the second boat 54 are attached to the tank. The tow lines are attached to towing ring 22. In one embodiment, towing boat 52 generates power and sends it via power cable 64 to power the tank and the skimmer. Floating oil booms 60 and 62 are used to corral and direct oil toward the tank. Boom 62 extends from the skimmer (not shown) on the port side of boat 52 around boat 52's bow and ends seamlessly at the skimmer 400 on the starboard side of boat 52. The same configuration applies to boat 54. Thus the line of boats and booms that corral and contain the oil is unbroken from the first boat to the last. Pushing the booms rather than towing them provides an easy way for boats to enter and leave the line without compromising the containment.

Note: Each towing boat needs a "pusher" attachment on its bow to keep the oil boom ahead of the bow and not under it. While such an attachment is necessary, it is not part of this invention.

Figure 3:
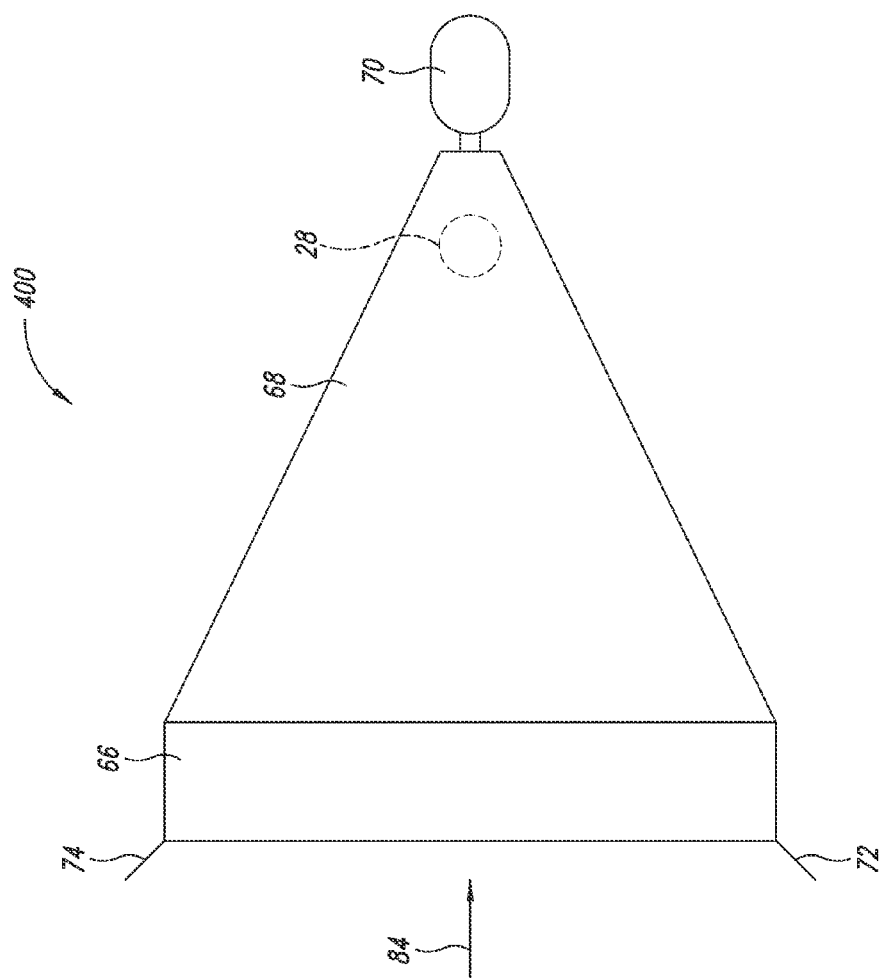
FIG. 3 is a top plan view of a skimmer attached to the tank of FIG. 1A.

FIG. 3 is a top-view diagram of an embodiment of an oil skimmer 400 that can be attached to a tank. In one embodiment, the skimmer conjoins two oil booms by clamping each boom to tabs 72 and 74 respectively, which are attached to the skimmer body 68 with vertical hinges. In one embodiment, a third float 70, along with the flotation provided by the two attached oil booms, forms a tripodal flotation configuration that maintains the average water level of the skimmer at the open slot between the spinning drums 76 and 78. In one embodiment, fender 66 keeps top drum 76 from spinning oil over the containment, and panel 68 covers the top of the skimmer mechanism.

Note: Each skimmer needs a debris screen or a debris diverter ahead of it to keep debris away from its mouth. While such a device is required it is not part of this invention.

FIG. 4 is a diagram of a side view of an embodiment of an oil skimmer 400 attached to the tank. The skimmer 400 skims the surface, allowing oil and water but not air to enter the tank body 3. In some embodiments, the skimmer coordinates the speeds of the spinning drums 76 and 78 and the suction-producing variable speed propeller 40 in the lower tail cup 32 of the tank through information provided by liquid level sensor within controller box 82. Except for the intake slot 84 between spinning drums 76 and 78, the body of the skimmer is hermetically sealed, much like a vacuum cleaner. In one embodiment, power for the skimmer is delivered by towing boat 52 through power cable 64.

In one embodiment, the speed of the skimmer 400 and the tank is controlled by an operator of the towing boat 52 and is dependent on the average thickness of the oil slick. Water and oil enter the skimmer opening 84, at average level 13 and encounter two spinning drums 76, 78. In one embodiment, these spinning drums have identical raised spur gears at each end; thus both drums rotate at the same speed and only one motor is required to rotate the drums. It is preferred that the distance between the drums should be somewhat greater than the depth of the oil slick. In another embodiment, labyrinth seals on the drums 76, 78 next to the spur gears and on the drum axles can prevent liquid from encroaching inside the drum. It is preferred that the labyrinth seal's lubricant be heavier than seawater so the lubricant cannot be forced out by the centrifugal force of the water. Seal 86, which may be made of felt or other similar material, is located between lower fender 68 and the lower spinning drum 78. Seal 86 reduces drag and turbulence that could cause oil to be thrown back outside of the skimmer. In other embodiments, scrapers 88 and 89 are located on the inward side of each spinning drum 76, 78 and run the length of the drum. They are used to scrape off any oil adhering to the drums and direct it into the skimmer. The upper scraper 88 also keeps air from escaping through the opening between the upper drum 76 and the fender 66. Each scraper is slightly flexed to stay in tight contact with its respective drum. Fender 66 covers the whole length of the upper drum, and does not require a seal between the upper drum 76 and fender 66.

In one embodiment, a float 80 floats on the surface of the liquid inside the skimmer 15 and is mechanically attached to controller box 82. The controller box 82 coordinates the speed of drums 76, 78 as well as the speed of the suction-producing variable speed propeller 40 in the lower tube 34 so that the liquid level within the skimmer remains more or less constant. In one embodiment, the controller box 82 houses the pivot for a lever arm 81 attached to float 80.

Oil and water enter the tank body 3 through tube 87 that connects in one embodiment to flexible tube 28. In one embodiment, a ball stop mechanism keeps air from entering the tank. The ball stop mechanism is a caged ball 90 that floats in liquid. If the liquid in the skimmer is drained, ball 90 reaches grommet 94 and is held in place by suction until enough liquid fills the skimmer.

In one embodiment, a ball joint 96, such as one on a tripod, is attached to a weighting mechanism to help keep the three floating points 70, 72, and 74 of the skimmer on the surface of the water. In another embodiment, rod 98, weighted by weight 100, goes through tube 24 to keep the skimmer near the tank and at approximately the best depth to allow surface liquid into the skimmer.

The operation of the combination of the tank 300 and skimmer 400 is as follows. Tank 300 moves through the water by being towed by boats 52 and 54 assisted by the tank's own motorized propeller 40 that receives power generated by one or both of the towing boats. Without propeller 40 the towed booms 60 and 62 would simply push the oil forward, and little or no oil could enter tank 300. Propeller 40 serves a triple function: it allows small boats with a generator to pull a larger tank than it otherwise could, it draws surface liquid into the tank, and it expels water from the tank. The two methods of propulsion also permit the speed of propeller 40 to vary somewhat without changing the speed of the towing vessels. This is convenient for several reasons. It allows the liquid level in skimmer 400 to be automatically controlled, since the amount of liquid entering the tank via the skimmer must equal the liquid exiting the tank, and the amount entering the skimmer can be controlled with drums 76 and 78. The propeller speed can be lessened to keep the booms from becoming slack. Skimmer 400 will ride the waves at a particular depth that admits only the topmost surface liquid, with a preference for oil. With the propeller turned on and the drums 76 and 78 spinning inward into the skimmer 400, oil and water will be sucked into tank 3 via pipe 26 quite efficiently, but some oil will still be pushed forward by the booms. Within tank 300 the oil, being considerably lighter than water, floats upward before it can be expelled, while new and displaced water stays below and is drawn toward the lower stern 32 of the tank. The propeller ejects water out through tube 34 to help move the tank forward. Any oil sensed in the lower section by a sensor indicates that the tank is sufficiently full of oil. If the tank is sufficiently full of oil, a switch shuts off the motorized propeller 40 and drums 76 and 78 and signals that the tank needs to be emptied.

FIG. 5A is a side view of an embodiment of an inverted pyramid funnel 500. One or more embodiments of a framed array of these inverted pyramid funnels can be referred to as a "dipping trap" and is further described below.

Figure 7:
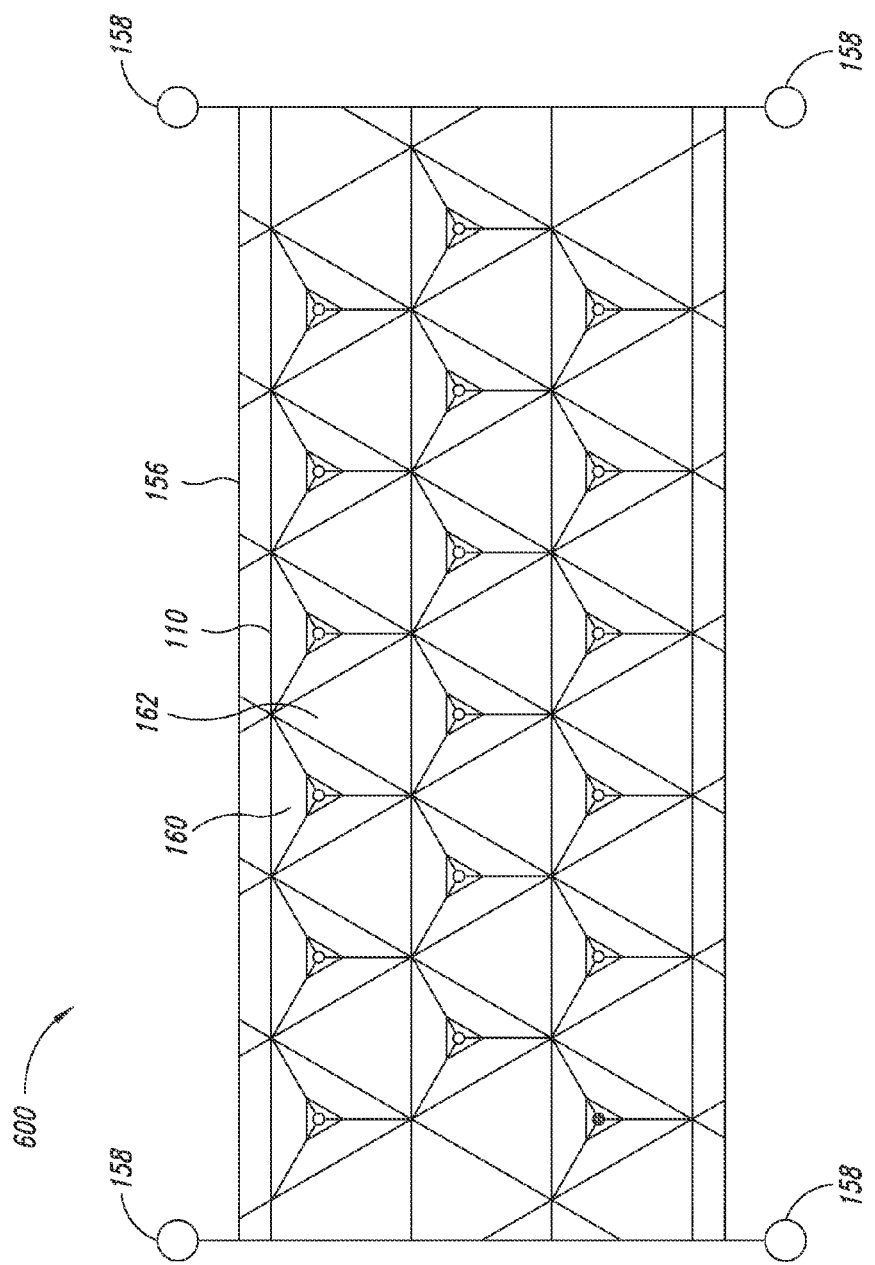
FIG. 7 is a top view of a first layer of a dipping trap (an array of inverted pyramid funnels of the type shown in FIG. 5A or FIG. 6).
Figure 8:
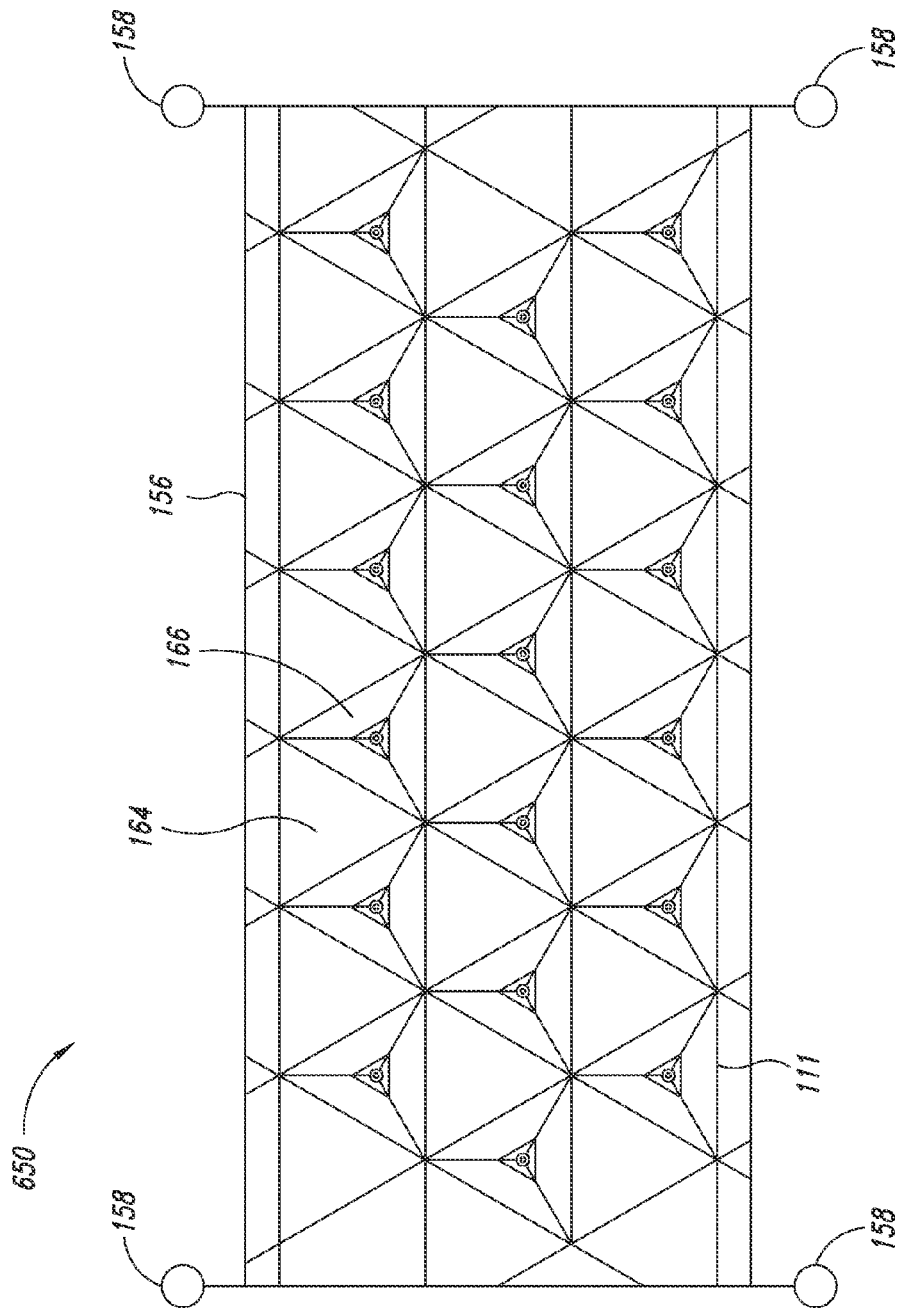
FIG. 8 is a top view of the second layer of the same frame as shown in FIG. 7.

In one embodiment, an inverted pyramid funnel is constructed by a film 102 stretched over tent rods 104. The tent rods 104, which may be made of materials including but not limited to aluminum and carbon fiber, fit into sleeves on the bottom and upper edges of the funnels. Upper rods are attached to fittings where an external and internal gusset 112 sandwiches the film at its peak and provides fittings for the top cap 108. The top cap 108 contains a check valve assembly (FIG. 5B), an oil drain 128 and vent tube 114. The bottom rods are attached at the corners to the upper rods with connectors to form the open base of the funnel and are also attached to the corners of the neighboring funnels or to the frame 156 as shown in FIG. 7 and FIG. 8. In a preferred embodiment, all surfaces should resist corrosion and tend to shed oil. A removable debris screen may be attached to the inverted funnel either at its base or elsewhere within it. Material, weight, wind and water resistance are reduced by giving the inverted funnel sides sharp angles with the horizontal.

In one embodiment, bottom tent rods 104 also serve as trusses that add to the frame's rigidity. In one embodiment, for large traps, three-sided pyramid funnels may be used because they impart more strength to the trap than four-sided pyramid funnels.

The inverted funnel has an external and internal gusset 112 that sandwiches the film 102 at the inverted funnel peak and provides fittings for the top cap 108 and vent tube 114. In some embodiments, the vent tube includes a coil spring 116 which may be covered with a waterproof and oil-proof material to give the vent tube enough flexibility to keep waves from snapping the vent tube 114 or otherwise damaging the funnel.

As an inverted funnel is submerged, any floating oil beneath the inverted funnel will concentrate at its peak. In one embodiment, the oil enters the top cap 108 from where the oil drains into a down-hose 118 and then into a larger feeder-hose 126 leading to an oil holding facility. A check valve in the top cap helps to keep water out of the oil hoses. Feeder-hose 126 has a unidirectional flow and may be connected to one or more inverted funnels in a serial fashion. In some embodiments, an in-line pump 142 in the feeder-hose is used to pump the oil into an oil holding tank.

Figure 5B:
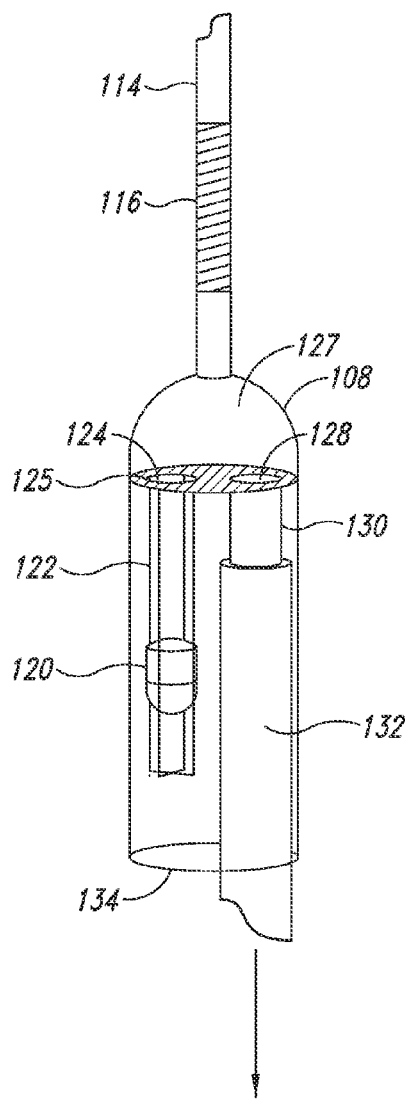
FIGS. 5B and 5C are isometric details of components in the inverted funnel at the locations shown in FIG. 5A.

FIG. 5B describes an embodiment of a check valve assembly within the top cap 108. When the inverted funnel 500 is lowered into the water, oil collects in chamber 127 and drains into the down-tube 130. The base of chamber 127 has an intake aperture 124 and a drain 128. The oil intake aperture 124 has an o-ring grommet 125 to make a watertight seal as stopper 120 is pressed against it. The oil is pushed into chamber 127, where the oil then drains through drain 128 into down-tube 130. Drain 128 curves downward around its rim. Down-tube 130 fits into the down-hose 132. The open bottom 134 of the top cap attaches to the external and internal gusset 112 at the peak of the inverted funnel.

A removable cage 122 keeps stopper 120 aligned with aperture 124. In one embodiment, cage 122 may be removed to adjust the specific gravity of stopper 120, or to clean the mechanism. In another embodiment, stopper 120 is a cylinder of highly polished metal or other material that tends to shed oil. In a preferred embodiment, stopper 120 has an adjustable specific gravity and floats on water but sinks in oil. In a preferred embodiment, the specific gravity of stopper 120 is set to the specific gravity of the body of water being cleaned, resulting in little to no oil loss and little to no water entering the hoses. The stopper 120 rises with the water level in the top cap, and when the water is about to enter the intake aperture 124, the stopper is pushed against grommet 125 by hydraulic pressure and does not re-open until the chamber 127 is raised above the external waterline. In one embodiment, the top cap 108 and vent tube 114 can be removed to allow the funnels to be stacked on land or on deck awaiting on-site assembly.

Figure 5C:
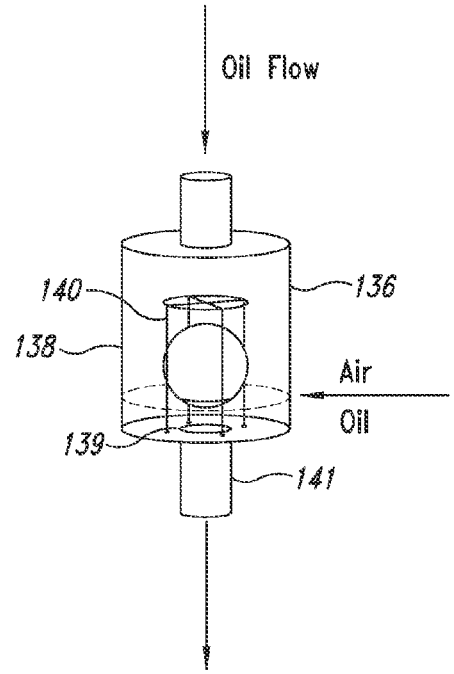

A check valve 136 may be located in down-hose 118 before reaching feeder-hose 126. An embodiment of check valve 136 is further described in FIG. 5C, where there is a reservoir containing a ball stop 138 within a cage 140 over exit pipe 141 that keeps air from being sucked into the feeder hose when the down-hose is empty. When all the oil has been removed, ball stop 138 is sucked against the grommet o-ring 139 making a hermetic seal and preventing air from entering the feeder hose 126. Since the ball stop 138 must be substantially vertical to function, in one embodiment the reservoir is attached to the funnel to keep the reservoir properly oriented.

Figure 6:
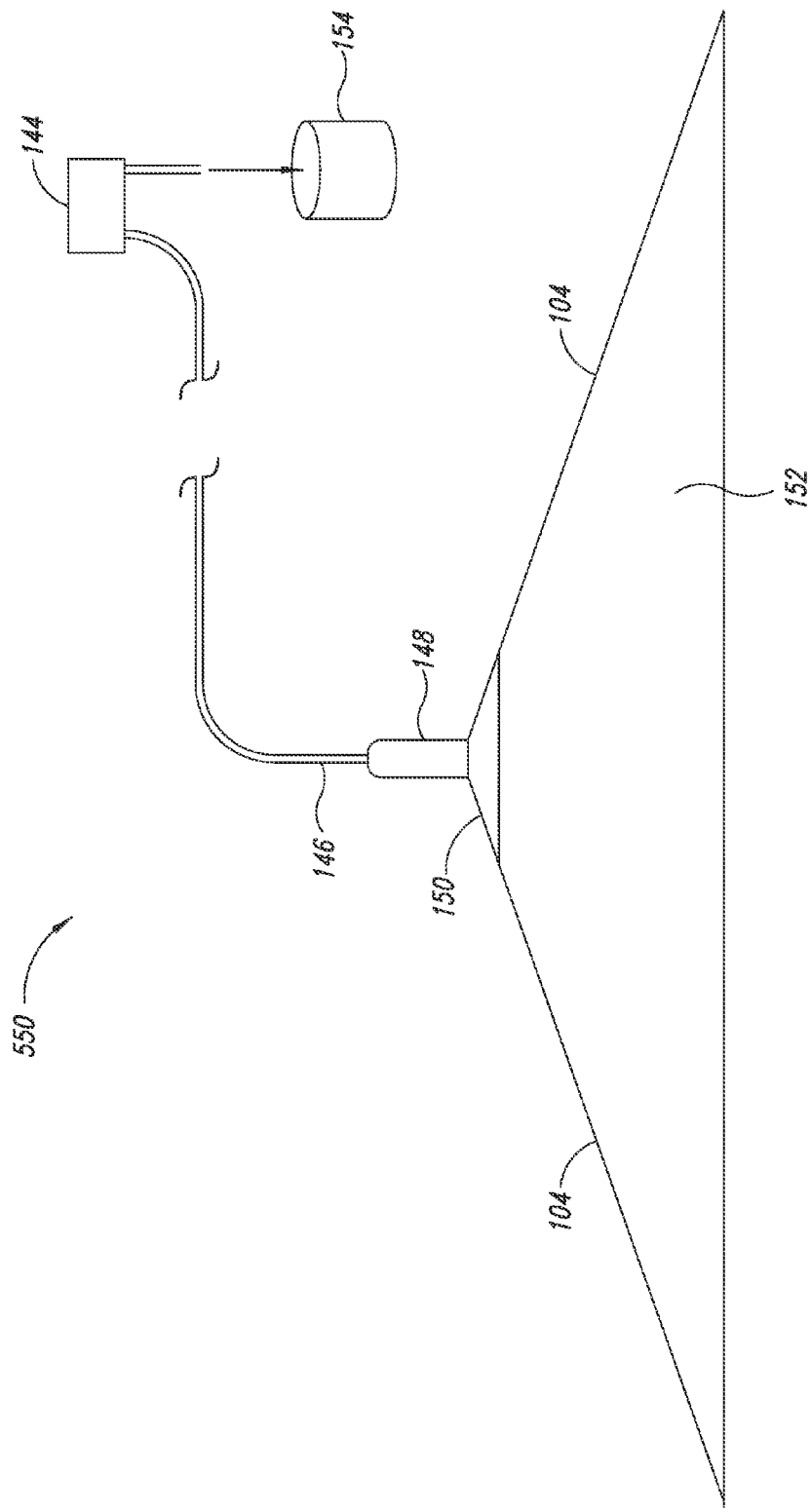
FIG. 6 is a side view of another embodiment of an inverted funnel.

FIG. 6 describes another embodiment of an inverted funnel 550 that is externally identical to the inverted funnel 500 of FIG. 5A except that the tall vent tube 114 is replaced by a hose 146 leading to a water sensing device 144 and then into an oil storage container. The construction of the tent is the same, as are the materials, but there are no internal hoses, and the insides of gusset 150 differs from insides of gusset 112 of FIG. 5A. It is raised and lowered in the same way as funnel 500 but with a faster cycle time. In one embodiment, gusset 150 provides fittings for the top cap 148. Internally gusset 150 houses a pump that is powered remotely. In some embodiments a pleated oil screen is attached to the gusset 150 to keep out debris. The surface area of the screen should be large enough not to clog for the duration of the clean-up. The top cap 148 is the neck of the inverted funnel into which the oil is concentrated. In one embodiment, if the pump uses a propeller, the propeller and its shaft extend into the top cap 148, which is otherwise empty of hardware.

Oil is pumped through hose 146 into holding tank 154 until device 144 senses water, which indicates that all oil has been pumped out, and shuts off the pump in its respective inverted funnel. At that point, in one embodiment, a vent opens within water sensing device 144 to allow the water to fall back down hose 146 and into the inverted funnel. Any remaining oil falls into the holding tank 154. In a preferred embodiment, the in-line water sensor is higher than top cap 148 and holding tank 154. In another embodiment, when water reaches water sensing device 144 it shuts off the pump in its respective inverted funnel and pumps the water back down the hoses, and pumps the oil into the holding tank. This embodiment would be preferable for very large traps where gravity feed would be too slow.

Figure 9:
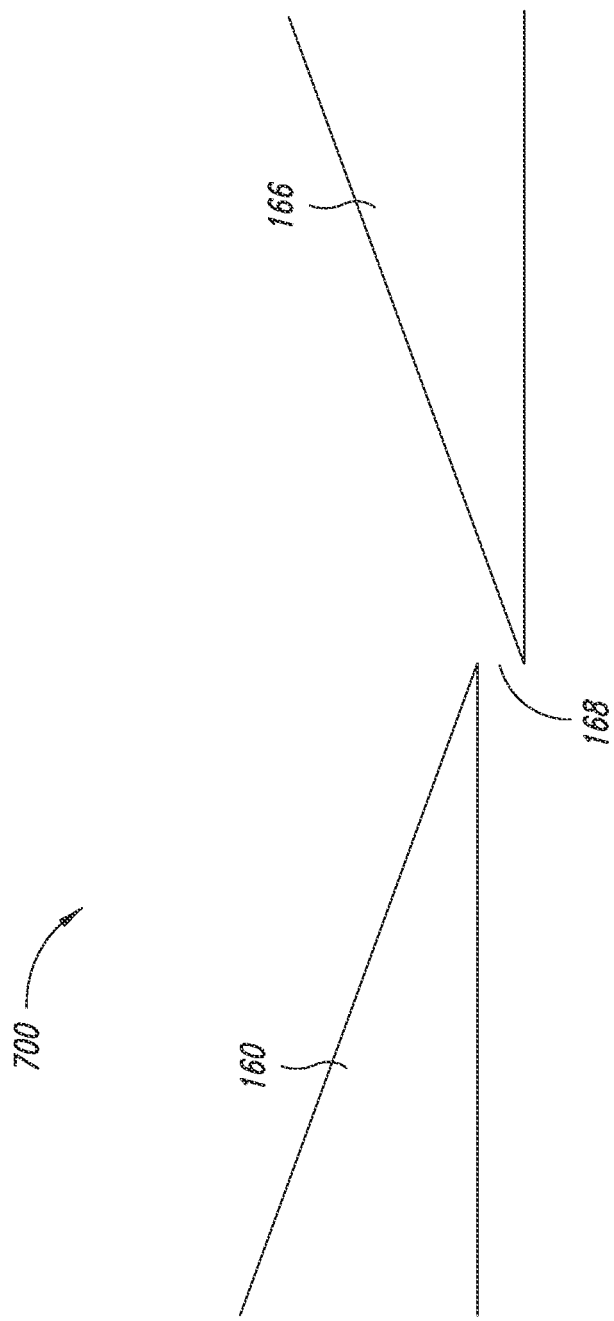
FIG. 9 is an enlarged side view of the edges of two inverted funnels of the first and second layers showing the vertical drain between adjacent funnels.

FIGS. 7-9 describe multiple views of an array of such funnels to form a dipping trap. There are a number of inverted funnels 160 that are connected together in order to capture oil at or near the surface of a body of water. In one embodiment, a dipping trap is suspended between two ships and lowered into the water. Each individual inverted funnel traps oil that is then removed from the necks before the dipping trap is raised and more oil fills in beneath the trap. The cycle is then repeated.

FIG. 7 and FIG. 8 represent top-down views of two different layers of a dipping trap embodiment with 36 inverted funnels consisting of two different layers with 18 inverted funnels each. FIG. 7 shows an upper-tier framework of 18 funnels and 18 empty spaces that represent one layer of a dipping trap. FIG. 8 describes a lower-tier, complementary framework of 18 funnels and 18 empty spaces, oppositely laid out from FIG. 7. The triangular funnels in the lower tier fit into the empty triangular spaces in the upper tier, and the upper tier funnels are directly above the empty spaces in the lower tier. FIG. 9 shows a partial side view profile of adjacent funnels 160 and 166 from two tiers where there is a vertical gap between the upper-tier and lower-tier framework of adjacent funnels that acts as a drain when the dipping trap is raised out of the water.

FIG. 7 describes one embodiment of an upper-tier array of inverted funnels. The bottom rods of the tent funnels 110 connect to frame 156 and act as trusses to strengthen the framework. Triangular trusses give greater strength than rectangular trusses. In a preferred embodiment, inverted funnels with equilateral triangle bases are used. These triangles have the shortest perimeter for their given area, which provides a lighter, stronger array of inverted funnels. Short tubes 158 extend outward from the frame 156 to hold poles that keep the oil boom away from the trap, and also serve as attachment points for hoisting, for raising and lowering the dipping trap. Bumpers on the frame corners cushion minor bumps against the boats. Floats along the frame keep a submerged trap at the correct depth.

FIG. 8 describes a matching embodiment of a lower-tier array of inverted funnels. The bottom rods of the tent funnels 111 connect to frame 156 and act as trusses to strengthen the framework. Triangular trusses give greater strength than rectangular trusses. Meeting the frame 156 at two different levels (110 and 111) makes the frame more rigid and less susceptible to sagging. When the upper-tier 600 and lower-tier 650 layers are put together, the top of the inverted funnels will mesh to create a complete dipping trap. For example, inverted funnel 160 will fit into the empty space 164, and inverted funnel 162 will fit into the empty space 166. The triangular checkerboard array of 3-sided tent funnels is rigidly attached to the frame with bottom rods extending from the base of each tent.

FIG. 9 demonstrates the vertical gap 168 between funnels (supporting structure is omitted in this view). The gap 168 makes the trap easier to lift out of the water due to the water and newly encroaching oil above the funnel having to drain only at the edges of frame 156. Any oil lost through these drains may be recaptured in a later dipping cycle. In one embodiment the vertical distance between these two levels are 1" to 1½." This gives the trap added resistance to sagging without adding weight, and leaves vertical drains between inverted funnels, making the trap quicker and easier to lift out of the water.

Figure 10:
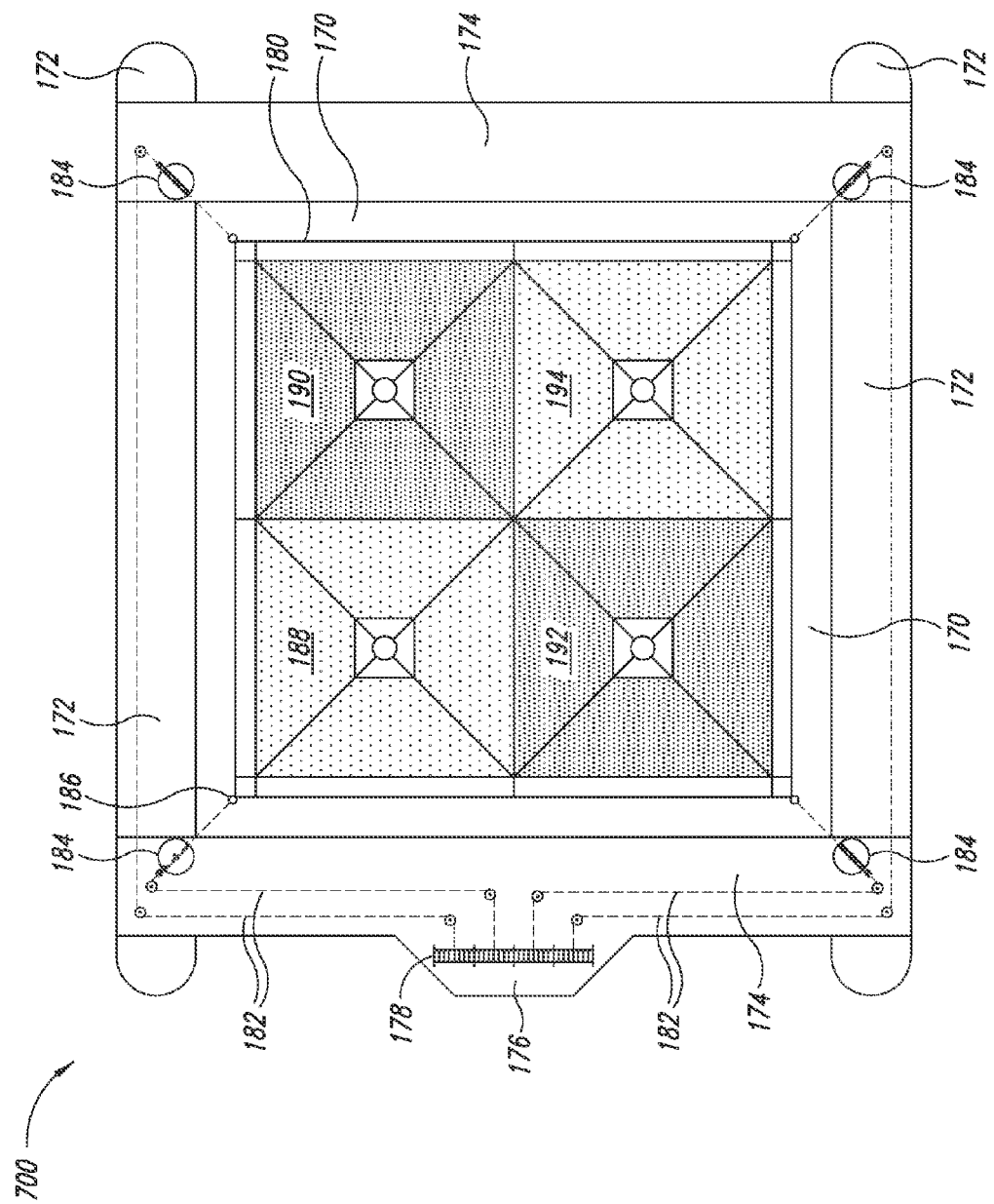
FIG. 10 is a top view of a self dipping trap.

FIG. 10 describes a top view of an embodiment of a self-dipping trap that is made up of four square-shaped inverted funnels. In one embodiment, the self-dipping trap is self-contained. It has its own carrier for floating on the surface of the water, and also contains its own hoisting mechanism to repeatedly raise and lower the inverted funnel array. In one embodiment, a self-dipping trap is a remotely powered, unmanned catamaran. A self-dipping trap may be deployed in an area in which the oil is contained by booms or natural barriers.

A self-dipping trap is deployed in open water 170. In one or more embodiments the trap may be suspended on crossbars 174 that are attached to inflatable film pontoons 172. A stern area 176 houses a reversible winch 178 that raises and lowers the frame 180. Lines 182 raise and lower the trap, and run from the winch 178 through pulleys to vertical posts 184. In some embodiments, vertical posts 184 have pulleys on top to give a 2:1 mechanical advantage when raising and lowering the frame 180. In one embodiment, the lines are attached at the four corners 186 of the frame 180. In one embodiment, the frame 180 is rigidly attached to the bottom rods of the funnels. In another embodiment, the inverted funnels are positioned in an upper-tier 188 and 194, and a lower-tier 190 and 192 configuration that are secured to frame 180 with the vertical distance between the two tiers providing a drain between the inverted funnels 168, making it easier to raise the array of inverted funnels out of the water.

Figure 11:
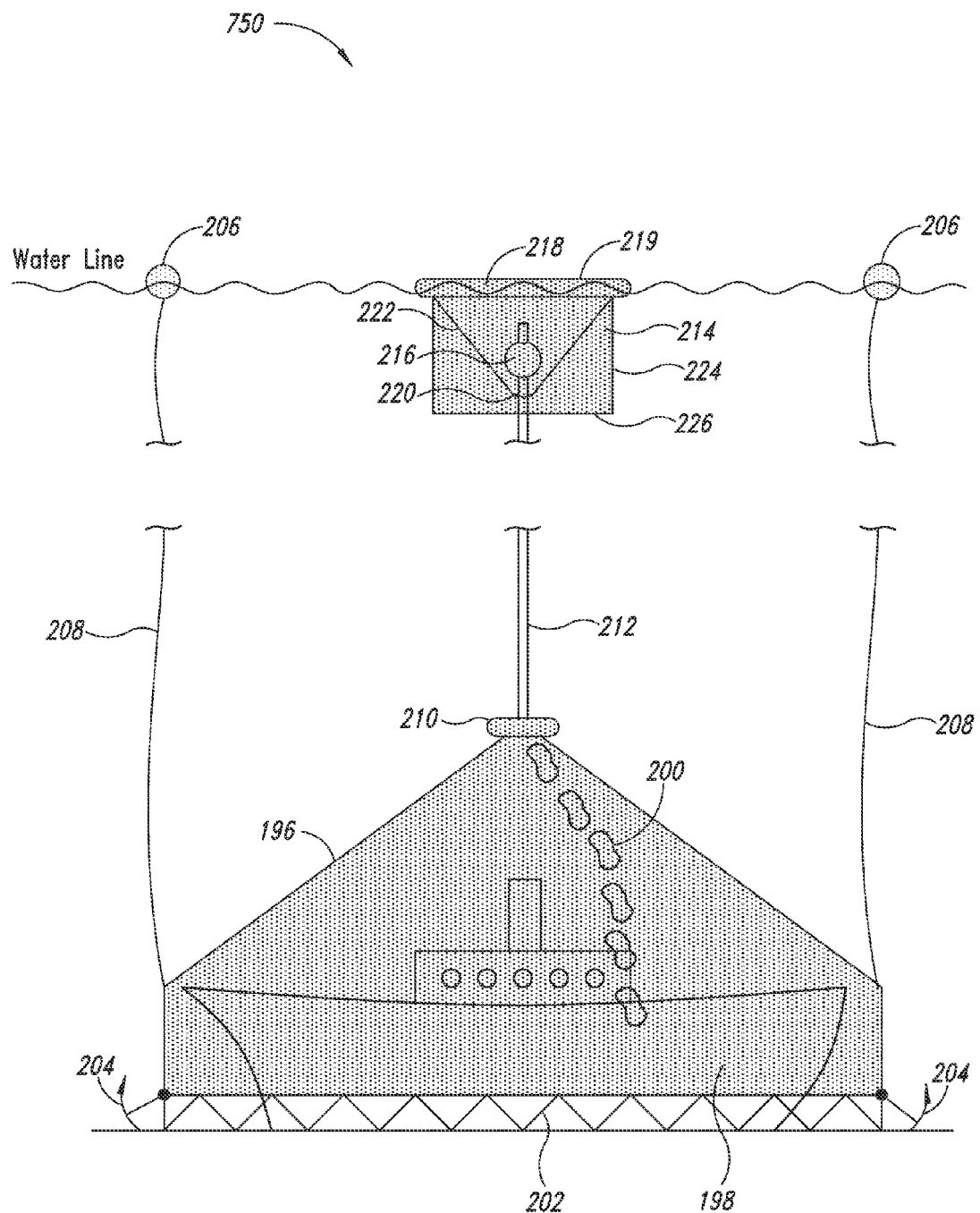
FIG. 11 is a side view of a containment tent encompassing a sunken ship leading to a rod and film oil containment tank at the surface.

FIG. 11 is description of an embodiment of a containment tent inverted funnel showing a non-limiting example involving leaking fuel or cargo oil from a sunken ship. This type of structure may also be used on any source of relatively slowly leaking oil at or near the bottom of a body of water. As leaking oil drifts upward through the water, the oil is captured in a containment tent and then funneled into a hose leading to an oil bag at the surface of the water. Because tides and waves change the distance from the oil leak to the surface, the oil bag must be free to move vertically independently of the hose yet be tall enough to keep the surface end of the hose within it.

In one embodiment, a containment tent 196, which may be made of lightweight, strong film such as but not limited to Mylar, Cuben fiber, or Silnylon, is placed over a submerged ship 198 that is leaking oil 200. In one embodiment, tent 196 is attached to a framework 202 that rests on the bottom. In another embodiment, framework 202 is constructed out of material such as but not limited to heavy steel rods that may be quickly pieced together once the area to be covered has been measured, and is used to secure the bottom of tent 196. The framework 202 allows water to flow in beneath the tent. If convenient, the tent may be attached to the sunken ship itself, which would require a diver or a robot for both installation and removal. In one embodiment the framework has attachments for anchors 204 and for one or more lines 208 that lower and raise the containment tent. Lines 208 connect to buoys at the surface, and should be long enough to accommodate the highest waves and tides. Flotation 210 at the top of the containment tent causes the tent to form and maintain the shape of an inverted funnel.

In one embodiment, hose 212 extends from containment tent 196 to a float 216 within the floating oil bag 214 that has sufficient buoyancy to keep the hose 212 approximately vertical. If the source of the oil is deep, the oil may have considerable pressure when released into bag 214. Therefore the nozzle 221 above the float 216 should diffuse the oil stream coming out of hose 212 to prevent damage to oil bag 214. Debris is kept out of hose 212 by a cylindrical pleated screen surrounding it (not shown) where hose 212 joins the containment tent 196. The surface area of the screen should be such that it will not clog for the duration of the clean-up. A floating ring 218 with a cover 219 serves as the top of the oil bag 214 and keeps it afloat. A pump-out cap 217 is located on one edge of cover 219. Float 216 is located near the surface end and is attached to hose 212. Ring 220 is positioned below float 216 and keeps hose 212 within bag 214. A plurality of support structures 222 from floating ring 218 to ring 220 keep the end of hose 212 approximately centered within bag 214. Sides 224 of oil bag 214 are attached to floating ring 218 to form a tight seal in order to not let out oil held within the open-ended oil bag 214. Sleeve 226 at the bottom of sides 224 contains a weighted ring to keep the bag cylindrical and the bottom of the bag open to the water. As the oil bag 214 fills with oil, the oil bag rises while water is displaced beneath it. Since the oil bag can be easily be made of any size, it probably should be made to hold all the oil that the ship could contain, as a precaution.

The containment tent 196 constructed as taught herein has a number of unique advantages. Since the containment tent 196 is made of a flexible material which is ultra-light weight and very strong, it can be made in any desired shape. For example, it can be made a shape to fully enclose a relatively larger vessel, such as a boat, an oil tank, an oil well under the water, or any other desired structure. The weights placed at the bottom along with anchors 204 and the framework 202 can be designed to be any particular shape according to the vessel to be contained within the tent 196. The tent 196 will capture any oil 200 which floats upward and, since the oil is lighter than water, it will gradually flow upward to the collection oil bag 214 where it can be removed and used.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A dipping trap apparatus for removing oil from the surface of a body of water comprising:
   an array of a plurality of inverted funnels, each funnel having a wide base and a narrow neck, all funnels in the array being located in a substantially horizontal plane;
   a frame coupled to the array, the frame supporting the inverted funnels, the frame including rods disposed at the base of the funnels, the rods being connected together at their intersections; and
   a support structure coupled to the array; and
   a funnel movement assembly coupled to the funnels to lower and raise funnels in the array into and out of the water.

2. The apparatus according to claim 1 comprising a plurality of funnel arrays arranged in plural tiers such that the bases of the inverted funnels are configured in a pattern in which the inverted funnel bases of different arrays are at different horizontal planes, with the funnel base of a first funnel being in a different plane than the base of any adjacent funnel.

3. The apparatus according to claim 1 wherein an inverted funnel further comprises:
   a removable top cap coupled at the neck of the inverted funnel;
   a removable vent tube connected to the top cap, the vent tube extending upward;
   a down-hose configured to drain oil from the top cap to a location outside of the funnel;
   a check-valve assembly within the top cap, the check-valve assembly coupled to the down-hose and configured to prevent water from entering the down-hose.

4. The apparatus according to claim 3, further comprising:
   a removable screen attached to the inverted funnel, the screen positioned to prevent entry of debris into the check-valve assembly;
   a feeder-hose coupled to the down-hose; and
   a secondary check-valve connected to the bottom end of the down-hose, the secondary check-valve configured to keep air from entering the feeder-hose.

5. The apparatus according to claim 4, wherein the feeder-hose is connected to the down-hoses of a plurality of inverted funnels; and wherein the down-hose of the furthest upstream inverted funnel does not contain a secondary check-valve.

6. The apparatus according to claim 1, wherein the support structure further comprises:
   at least two hulls;
   a hull support structure connecting the hulls, the hull support structure configured to suspend the array of inverted funnels above the water and to allow the array to be raised and lowered into the water; and
   a winch connected to the hull support structure, the winch having one or more cables connecting the winch to the array of inverted funnels and configured to lower and raise the array into and out of the water.

7. The apparatus according to claim 1, wherein the support structure further comprises:
   one or more ships;
   an array support structure connecting the dipping trap to the one or more ships, the array support structure configured to raise and lower the array into the water.

8. The apparatus according to claim 1, wherein the bases of the inverted funnels are configured to allow vertical drainage between the funnels.

9. The apparatus according to claim 1 wherein an inverted funnel further comprises:
   a removable top cap at the neck of the inverted funnel;
   a motorized pump in or above the top cap;
   a hose assembly connected to the motorized pump to transport the oil from the neck of the funnel to a location outside the funnel.

10. The apparatus according to claim 9 further comprising:
   A screen attached to the inverted funnel that is positioned to prevent entry of debris into the motorized pump.

11. The apparatus according to claim 9 further comprising:
   A water sensor mechanism connected to the hose, the water sensor mechanism operable to shut off the motorized pump and open a vent within the water sensor mechanism when water is sensed in the mechanism.

12. A dipping trap apparatus for removing oil from the surface of a body of water comprising:
   an array of a plurality of inverted funnels, each funnel having a wide base and a narrow neck;
   a frame coupled to the array, the frame supporting the inverted funnels, the frame including rods disposed at the base of the funnels, the rods being connected together at their intersections; and
   a support structure coupled to the array;
   a funnel movement assembly coupled to the funnels to lower and raise the array into and out of the water;
   a removable top cap coupled at the neck of the inverted funnel;
   a removable vent tube connected to the top cap, the vent tube extending upward;

a down-hose configured to drain oil from the top cap to a location outside of the funnel;

a check-valve assembly within the top cap, the check-valve assembly coupled to the down-hose and configured to prevent water from entering the down-hose.

13. The apparatus according to claim 12, further comprising:

a removable screen attached to the inverted funnel, the screen positioned to prevent entry of debris into the check-valve assembly;

a feeder-hose coupled to the down-hose; and a secondary check-valve connected to the bottom end of the down-hose, the secondary check-valve configured to keep air from entering the feeder-hose.

14. The apparatus according to claim 13, wherein the feeder-hose is connected to the down-hoses of a plurality of inverted funnels; and wherein the down-hose of the furthest upstream inverted funnel does not contain a secondary check-valve.

\* \* \* \* \*